(12) United States Patent
Hanson et al.

(10) Patent No.: US 11,509,833 B2
(45) Date of Patent: Nov. 22, 2022

(54) ILLUMINATION CONTROL FOR VEHICLE SENSORS

(71) Applicant: Ford Global Technologies, LLC, Dearborn, MI (US)

(72) Inventors: Ryan Edwin Hanson, Livonia, MI (US); Ali Hassani, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/191,874

(22) Filed: Mar. 4, 2021

(65) Prior Publication Data

US 2022/0286594 A1 Sep. 8, 2022

(51) Int. Cl.
*H04N 5/235* (2006.01)
*B60R 11/04* (2006.01)

(52) U.S. Cl.
CPC ........... *H04N 5/2351* (2013.01); *B60R 11/04* (2013.01); *H04N 5/2352* (2013.01)

(58) Field of Classification Search
CPC ..... H04N 5/2351; H04N 5/2352; B60R 11/04
See application file for complete search history.

(56) References Cited

U.S. PATENT DOCUMENTS

| 6,587,183 | B1* | 7/2003 | Uomori ................. G06T 7/521 |
| | | | 348/E5.058 |
| 7,855,778 | B2 | 12/2010 | Yung et al. |
| 8,379,138 | B2* | 2/2013 | Mise ...................... G03B 13/00 |
| | | | 396/125 |
| 9,037,354 | B2 | 5/2015 | Mondragon et al. |
| 10,807,515 | B2 | 10/2020 | Higgins-Luthman et al. |
| 2014/0068740 | A1* | 3/2014 | LeCun ................. G06V 10/464 |
| | | | 726/7 |
| 2020/0272831 | A1 | 8/2020 | Cho |
| 2020/0377007 | A1 | 12/2020 | Fujiyama et al. |
| 2020/0389579 | A1* | 12/2020 | Ise ....................... H04N 5/2354 |

FOREIGN PATENT DOCUMENTS

| CN | 107101612 A | 8/2017 |
| JP | 200785845 A | 4/2007 |

\* cited by examiner

*Primary Examiner* — Shahbaz Nazrul
(74) *Attorney, Agent, or Firm* — Frank Lollo; Bejin Bieneman PLC (57) ABSTRACT

A system includes an illumination source, a camera arranged to detect illumination from the illumination source, and a computer communicatively coupled to the illumination source and the camera. The computer is programmed to detect an object in image data from the camera, identify landmarks of the object in the image data, determine a distance from the camera to the object based on a pixel distance between the landmarks in the image data, and adjust a brightness of the illumination source based on the distance.

20 Claims, 3 Drawing Sheets

ILLUMINATION CONTROL FOR VEHICLE SENSORS

BACKGROUND

Vehicles are often equipped with cameras. The cameras detect electromagnetic radiation in some range of wavelengths. The wavelengths can be visible light, infrared radiation, ultraviolet light, or some range of wavelengths including visible, infrared, and/or ultraviolet light. The cameras include image sensors such as charge-coupled devices (CCD), active-pixel sensors such as complementary metal-oxide semiconductor (CMOS) sensors, etc.

For situations in which the ambient environment is insufficiently illuminated for the cameras, vehicles are equipped with illumination sources. The illumination sources are arranged to illuminate areas in the fields of view of the cameras. The cameras thereby receive illumination from the illumination sources reflected from features of the environment.

DETAILED DESCRIPTION

The system described herein provides good illumination of an environment for a camera while keeping the illumination within appropriate levels for a person in the environment. The illumination can come from an illumination source with an adjustable brightness. Greater illumination of an environment by the illumination source permits more information to be discerned from image data of the environment generated by the camera. At the same time, the illumination source should be kept at an appropriate level for persons in the environment. This can be particularly important for illumination outside the visible spectrum because in this range a person's defensive physiological responses such as narrowing their pupils may not occur. The system described herein determines a distance to the person and adjusts the brightness of the illumination source based on the distance. The brightness can thus be maximized for the distance of the person, rather than keeping the brightness at a constant, low level that is appropriate even at short distances (e.g., because of the aforementioned concerns about a person's ability to react or adjust to light outside the visible spectrum). Moreover, the brightness can be adjusted in real-time, e.g., lowering the brightness as the person moves closer to the camera. Furthermore, the distance is determined based on image data from the camera of the person, meaning that no components are needed besides the camera and the illumination source. The cost and complexity of the system is thus kept low. The system is described below with respect to an automotive context. The system is also useful in other contexts such as security and monitoring systems, doorbell camera systems, surveillance systems, etc.

A system includes an illumination source, a camera arranged to detect illumination from the illumination source, and a computer communicatively coupled to the illumination source and the camera. The computer is programmed to detect an object in image data from the camera, identify landmarks of the object in the image data, determine a distance from the camera to the object based on a pixel distance between the landmarks in the image data, and adjust a brightness of the illumination source based on the distance.

The illumination source may be configured to produce illumination outside a visible range. The illumination source may be configured to produce infrared illumination.

A computer includes a processor and a memory storing instructions executable by the processor to detect an object in image data from a camera, identify landmarks of the object in the image data, determine a distance from the camera to the object based on a pixel distance between the landmarks in the image data, and adjust a brightness of an illumination source based on the distance. The illumination source is arranged to produce illumination detectable by the camera.

The object may be a human face. The instructions may further include instructions to, after adjusting the brightness of the illumination source and receiving new image data, perform facial recognition on the new image data of the face. The instructions may further include instructions to actuate a vehicle component upon the facial recognition recognizing the face as a recognized face.

The instructions may further include instructions to determine whether a feature of the face is three-dimensional. The illumination source may be a first illumination source, and the instructions may further include instructions to illuminate a second illumination source while receiving the new image data.

Adjusting the brightness of the illumination source may include adjusting the brightness to a brightness level, and the brightness level may have an increasing relationship with the distance.

Determining the distance from the camera to the object may include multiplying the pixel distance by a prestored distance-to-pixel-distance ratio. The prestored distance-to-pixel-distance ratio may be based on at least a 90th percentile size of a statistical distribution of objects of a same type as the object.

The instructions may further include instructions to determine whether the object is sufficiently illuminated for identifying the landmarks of the object. The instructions may further include instructions to increase the brightness of the illumination source upon determining that the object is insufficiently illuminated for identifying the landmarks of the object. The instructions may further include instructions to decrease the brightness of the illumination source within a prestored duration after increasing the brightness. The prestored duration may be at most a duration in which the camera can capture five frames.

Increasing the brightness may include increasing the brightness to a prestored brightness level, and the instructions may further include instructions to prevent the brightness of the illumination source from being set to the prestored brightness level for longer than the prestored duration.

Increasing the brightness may include increasing the brightness at a prestored rate while receiving additional image data. The instructions may further include instructions to maintain the brightness at a current brightness level upon determining that the object is sufficiently illuminated for identifying the landmarks of the object.

A method includes detecting an object in image data from a camera, identifying landmarks of the object in the image data, determining a distance from the camera to the object based on a pixel distance between the landmarks in the image data, and adjusting a brightness of an illumination source based on the distance. The illumination source is arranged to produce illumination detectable by the camera.

With reference to the Figures, a system 102 of a vehicle 100 includes at least one illumination source 104, at least one camera 106 arranged to detect illumination from one or more of the at least one illumination source 104, and a computer 108 communicatively coupled to the at least one illumination source 104 and the at least one camera 106. The computer 108 is programmed to detect an object 110 in image data 112 from the at least one camera 106, identify landmarks 114 of the object 110 in the image data 112, determine a distance D from the at least one camera 106 to the object 110 based on a pixel distance d between the landmarks 114 in the image data 112, and adjust a brightness of the at least one illumination source 104 based on the distance D.

Figure 1:
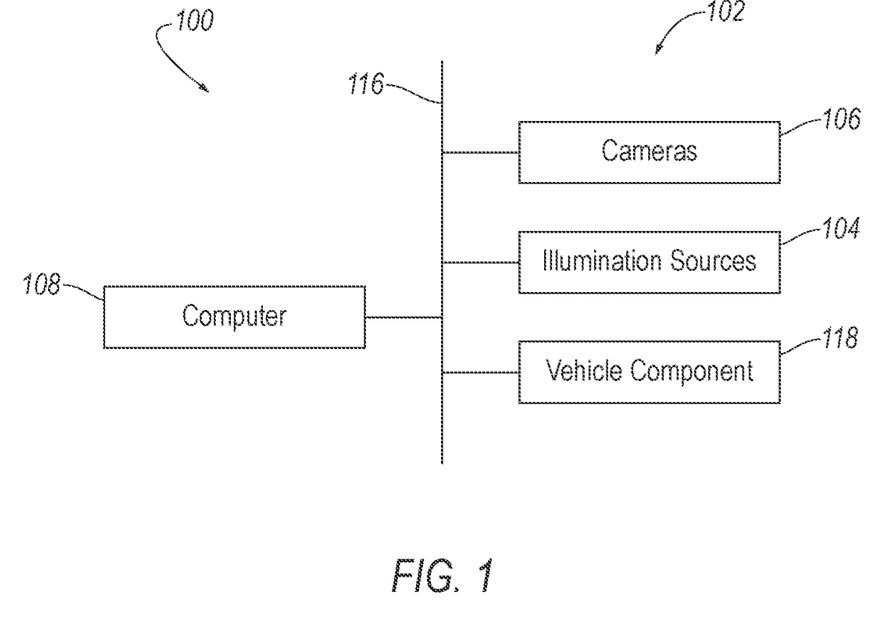
FIG. 1 is a block diagram of an example vehicle.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. A vehicle computer can be programmed to operate the vehicle 100 independently of the intervention of a human operator, completely or to a lesser degree. The vehicle computer may be programmed to operate the propulsion, brake system, steering system, and/or other vehicle systems based on data from the at least one camera 106 and other sensors. For the purposes of this disclosure, autonomous operation means the vehicle computer controls the propulsion, brake system, and steering system without input from a human operator; semi-autonomous operation means the vehicle computer controls one or two of the propulsion, brake system, and steering system and a human operator controls the remainder; and nonautonomous operation means a human operator controls the propulsion, brake system, and steering system.

The computer 108 is a microprocessor-based computing device, e.g., a generic computing device including a processor and a memory, an electronic controller or the like, a field-programmable gate array (FPGA), an application-specific integrated circuit (ASIC), etc. The computer 108 can thus include a processor, a memory, etc. The memory of the computer 108 can include media for storing instructions executable by the processor as well as for electronically storing data and/or databases, and/or the computer 108 can include structures such as the foregoing by which programming is provided. The computer 108 can be multiple computers coupled together. The computer 108 may be the same as the vehicle computer or may be separate from the vehicle computer.

The computer 108 may transmit and receive data through a communications network 116 such as a controller area network (CAN) bus, Ethernet, WiFi, Local Interconnect Network (LIN), onboard diagnostics connector (OBD-II), and/or by any other wired or wireless communications network. The computer 108 may be communicatively coupled to the cameras 106, the illumination sources 104, and other vehicle components 118 via the communications network 116.

The cameras 106 detect electromagnetic radiation in some range of wavelengths. For example, the cameras 106 may detect visible light, infrared radiation, ultraviolet light, or some range of wavelengths including visible, infrared, and/or ultraviolet light. For example, the cameras 106 can include image sensors such as charge-coupled devices (CCD), active-pixel sensors such as complementary metal-oxide semiconductor (CMOS) sensors, etc. The cameras 106 are configured to detect illumination from respective illumination sources 104; i.e., the range of wavelengths of electromagnetic radiation detectable by the camera 106 completely or significantly overlap the range of wavelengths produced by the respective illumination source 104.

The illumination sources 104 can produce illumination in some range of wavelengths, specifically, illumination detectable by the cameras 106. For example, the illumination sources 104 may produce visible light, infrared radiation, ultraviolet light, or some range of wavelengths including visible, infrared, and/or ultraviolet light. The illumination sources 104 are configured to produce illumination in a range of wavelengths completely or significantly encompassed by the range of wavelengths detectable by the cameras 106. For example, the illumination sources 104 can produce and the cameras 106 can detect illumination outside a visible range, e.g., infrared illumination, e.g., near-infrared illumination (700-1300 nanometers (nm)). The illumination sources 104 can be any suitable types for producing the desired wavelengths, e.g., for visible light, tungsten, halogen, high-intensity discharge (HID) such as xenon, light-emitting diodes (LED), etc.; for infrared light, LEDs, lasers, filtered incandescent, etc.

The vehicle 100 includes the vehicle components 118 that are actuatable by the computer 108 in response to image data 112 from the cameras 106, as described below. Examples of vehicle components 118 include door locks 120, seats 122, a climate-control system 124, etc., as are described in detail below. Other vehicle components 118 besides these examples can be actuatable by the computer 108 in response to image data 112 from the cameras 106.

Figure 2:
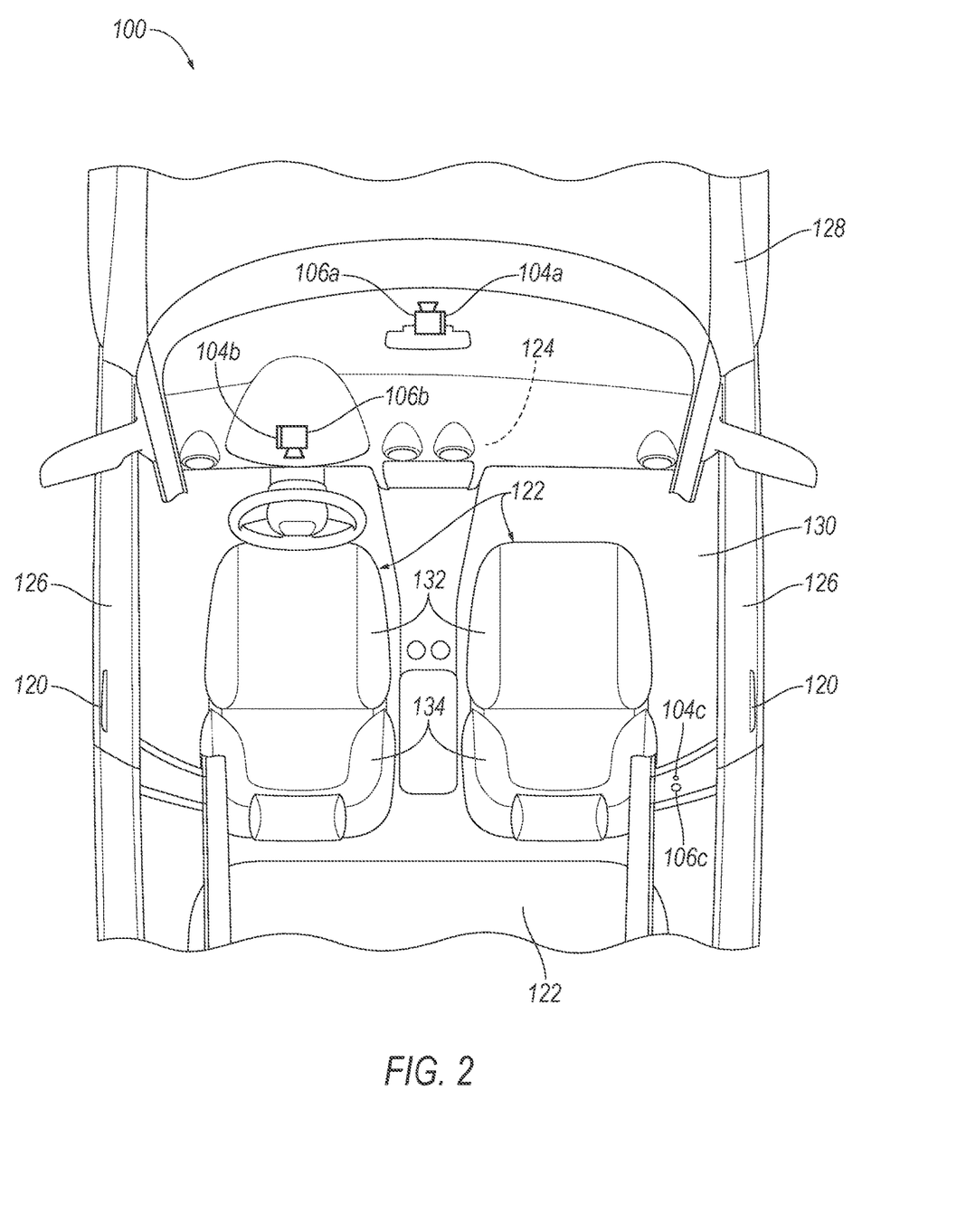
FIG. 2 is a top view of the example vehicle with a passenger cabin exposed for illustration.

With reference to FIG. 2, the vehicle 100 includes a body 128. The vehicle 100 may be of a unibody construction, in which a frame and the body 128 of the vehicle 100 are a single component. The vehicle 100 may, alternatively, be of a body-on-frame construction, in which the frame supports the body 128 that is a separate component from the frame. The frame and the body 128 may be formed of any suitable material, for example, steel, aluminum, etc.

The door locks 120 are engageable to permit or prevent doors 126 of the vehicle 100 from being opened. The door locks 120 are movable between a disengaged position, in which doors 126 are unlocked, i.e., permitted to open if the door handle is operated, and an engaged position, in which the doors 126 are locked, i.e., prevented from opening even if the door handle is operated.

The vehicle 100 includes a passenger cabin 130 to house occupants, if any, of the vehicle 100. The passenger cabin 130 includes one or more of the seats 122 disposed in a front row of the passenger cabin 130 and one or more of the seats 122 disposed in a second row behind the front row. The passenger cabin 130 may also include third-row seats 122 (not shown) at a rear of the passenger cabin 130. In FIG. 2, the front-row seats 122 are shown to be bucket seats, but the seats 122 may be other types. The position and orientation of the seats 122 and components thereof may be adjustable by an occupant.

Each seat 122 can include actuators for adjusting the seat 122 in multiple degrees of freedom, e.g., a tilt of the seat 122, a height of the seat 122, a recline angle of the seat 122, or a lumbar support position of the seat 122. The tilt of the seat 122 is an angle of a seat bottom 132 of the seat 122 relative to the passenger cabin 130 about a lateral axis, i.e., a pitch of the seat bottom 132. The height of the seat 122 is a vertical distance of a reference point on the seat bottom 132 relative to the passenger cabin 130. The recline angle of the seat 122 is an angle of a seat back 134 of the seat 122 relative to the seat bottom 132. The lumbar support position is a vehicle-forward position of a lumbar support bar (not shown), located in the seat back 134, relative to the seat back 134. Additionally or alternatively, the seat 122 may be adjustable in other degrees of freedom.

The climate-control system 124 provides heating and/or cooling to the passenger cabin 130 of the vehicle 100. The climate-control system 124 may include a compressor, a condenser, a receiver-dryer, a thermal-expansion valve, an evaporator, blowers, fans, ducts, vents, vanes, temperature sensors, and other components that are known for heating or cooling vehicle interiors. The climate-control system 124 may operate to cool the passenger cabin 130 by transporting a refrigerant through a heat cycle to absorb heat from the passenger cabin 130 and expel the heat from the vehicle 100, as is known. The climate-control system 124 may include a heater core that operates as a radiator for an engine of the vehicle 100 by transferring some waste heat from the engine into the passenger cabin 130, as is known. The climate-control system 124 may include an electrically powered heater such as a resistive heater, positive-temperature-coefficient heater, electrically powered heat pump, etc.

Figure 3:
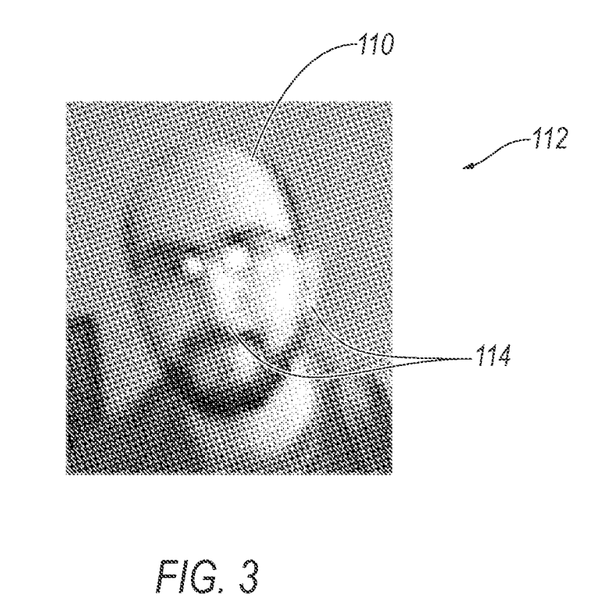
FIG. 3 is an example frame of image data from a camera of the vehicle.

The cameras 106 are typically arranged in positions to detect persons in the vicinity of the vehicle 100, e.g., occupants and/or pedestrians. For example, the cameras 106 can include a first camera 106a with a field of view encompassing an area in front of the vehicle 100. The first camera 106a can be mounted on or above a rear-view mirror and aimed in a vehicle-forward direction. For another example, the cameras 106 can include a second camera 106b with a field of view encompassing an operator of the vehicle 100. The second camera 106b can be mounted to an instrument panel and aimed in a vehicle-rearward direction, as shown in FIG. 3. The second camera 106b can be arranged to include one or more occupants, e.g., only the operator, or all the occupants, etc., of the passenger cabin 130. For another example, the cameras 106 can include a third camera 106c with a field of view encompassing an area next to the doors 126 of the vehicle 100. The third camera 106c can be mounted to a B-pillar of the vehicle 100 and aimed in a vehicle-lateral direction. A person approaching the door 126 will be in the field of view of the third camera 106c.

The illumination sources 104 are arranged to produce illumination detectable by the cameras 106, and likewise the cameras 106 are arranged to detect illumination from the illumination sources 104. Specifically, the illumination sources 104 are arranged to illuminate areas in the fields of view of the cameras 106, and the cameras 106 are arranged so that the fields of view of the cameras 106 encompass areas illuminated by the illumination sources 104. The cameras 106 thereby receive illumination from the illumination sources 104 that has reflected off of features of the environment. For example, the illumination sources 104 can each be mounted to a respective one of the cameras 106 and aimed in the same direction as that camera 106. The respective pairings of illumination sources 104 and cameras 106 can be packaged as a single unit. The illumination sources 104 can include a first illumination source 104a mounted to the first camera 106a, a second illumination source 104b mounted to the second camera 106b, a third illumination source 104c mounted to the third camera 106c, and so on.

With reference to FIG. 3, the cameras 106 generate image data 112 of the respective fields of view of the cameras 106. The image data 112 are a sequence of image frames of the fields of view of the respective cameras 106. FIG. 3 shows an example image frame of a person's face. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. For example, FIG. 3 is an image frame in which each pixel is a scalar value of intensity of illumination in near-infrared wavelengths. Position in an image frame, i.e., position in the field of view of the camera 106 at the time that the image frame was recorded, can be specified in pixel dimensions or coordinates, e.g., an ordered pair of pixel distances, such as a number of pixels from a top edge and a number of pixels from a left edge of the field of view.

The image data 112 can be of objects 110 that are in the field of view of one of the cameras 106. One such object 110 is a human face, as shown in FIG. 3. The objects 110 can include landmarks 114. For the purposes of this disclosure, a "landmark" is defined as a predefined feature on each object 110 of a specific type, which is shared by objects 110 of that type. For example, if the type of object 110 is a human face, possible landmarks 114 are a center of the nose, a bottom of the ear, a corner of the mouth, etc.

Figure 4:
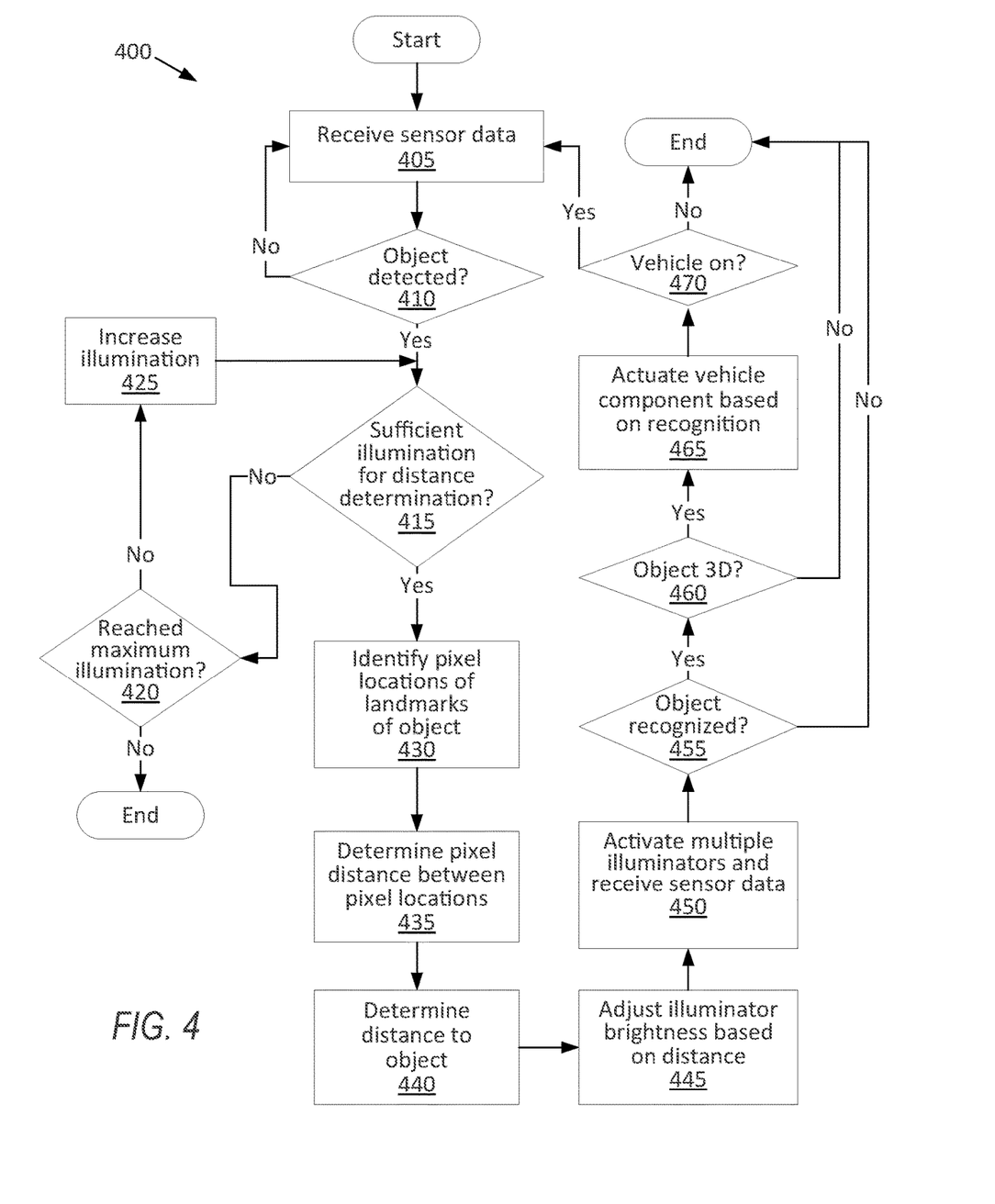
FIG. 4 is a process flow diagram of an example process for controlling illumination sources of the vehicle.

FIG. 4 is a process flow diagram illustrating an exemplary process 400 for controlling the illumination sources 104. The memory of the computer 108 stores executable instructions for performing the steps of the process 400 and/or programming can be implemented in structures such as mentioned above. The process 400 can be performed individually for each of the cameras 106. As a general overview of the process 400, the computer 108 receives image data 112 from the camera 106 and determines whether an object 110, such as a human face, is present in the image data 112. If so, the computer 108 determines whether there is sufficient illumination for a distance determination and increases the illumination from the illumination source 104 paired with the camera 106 if not. For the distance determination, the computer 108 identifies pixel locations of landmarks 114 of the object 110, determines a pixel distance d between the pixel locations, and determines the distance D to the object 110 using the pixel distance d. The computer 108 adjusts the brightness of the illumination source 104 paired with the camera 106 based on the distance D. The computer 108 activates multiple illumination sources 104 while receiving image data 112 from the camera 106. Using the new image data 112, the computer 108 determines whether the object 110 is recognized, e.g., as an authorized user, and whether the object 110 is three-dimensional. If so, the computer 108 actuates one of the vehicle components 118. The process 400 is performed continuously while the vehicle 100 is on.

The process 400 begins in a block 405, in which the computer 108 receives image data 112 from the camera 106, e.g., receives an image frame from the camera 106.

Next, in a decision block 410, the computer 108 detects whether an object 110, e.g., a human face, is in the image data 112, e.g., using facial detection. The computer 108 can detect the human face in the image data 112 by using any suitable facial-detection technique, e.g., knowledge-based techniques such as a multiresolution rule-based method; feature-invariant techniques such as grouping of edges, space gray-level dependence matrix, or mixture of Gaussian; template-matching techniques such as shape template or active shape model; or appearance-based techniques such as eigenface decomposition and clustering, Gaussian distribution and multilayer perceptron, neural network, support vector machine with polynomial kernel, a naive Bayes classifier with joint statistics of local appearance and position, higher order statistics with hidden Markov model, or Kullback relative information. If no object 110 is detected, the process 400 returns to the block 405 to continue monitoring the image data 112. If an object 110 is detected, the process 400 proceeds to a decision block 415.

In the decision block 415, the computer 108 determines whether the object 110 is sufficiently illuminated for identifying the landmarks 114 of the object 110. The object 110 can be illuminated both by the illumination sources 104 and by ambient sources of illumination. For example, the computer 108 can average the light intensity of each pixel of the image frame, or of each pixel that is part of the object 110 detected in the decision block 410. The average brightness can be compared with a brightness threshold, and the object 110 is sufficiently illuminated if the brightness is above the brightness threshold and insufficiently illuminated if the brightness is below the brightness threshold. The brightness threshold can be chosen as a minimum brightness for the computer 108 to successfully identify the landmarks 114 in a block 430 below. For another example, the computer 108 can perform the identification of the landmarks 114 described below with respect to the block 430. If the computer 108 successfully identifies the landmarks 114, then the object 110 is sufficiently illuminated, and if not, then the object 110 is insufficiently illuminated. If the object 110 is insufficiently illuminated, the process 400 proceeds to a decision block 420. If the object 110 is sufficiently illuminated, the process 400 proceeds to the block 430.

In the decision block 420, the computer 108 determines whether one of the illumination sources 104 has reached a maximum level of illumination. Specifically, the illumination source 104 can be the illumination source 104 that is paired with the camera 106, e.g., the first illumination source 104a for the first camera 106a, the second illumination source 104b for the second camera 106b, the third illumination source 104c for the third camera 106c, etc. The maximum illumination is a brightness level of the illumination source 104 chosen to be an appropriate, e.g., to avoid damaging a person's eyes, brightness level for a person near the illumination source 104 for the interval of time for which the illumination source 104 will remain illuminated at that brightness level. For example, the maximum level of illumination can be brighter for very short intervals. If the illumination source 104 has already reached the maximum level of illumination, the process 400 ends. If the illumination source 104 has not yet reached the maximum level of illumination, the process 400 proceeds to a block 425.

In the block 425, the computer 108 increases the brightness of the illumination source 104. For example, the computer 108 can increase the brightness at a prestored rate while receiving additional image data 112 from the camera 106. The prestored rate is a change in brightness per unit time and can be chosen based on a rate at which the camera 106 generates image frames of image data 112 and a rate at which the computer 108 determines whether the object 110 is sufficiently illuminated in the decision block 415. The process 400 thus iterates through the decision block 415, the decision block 420, and the block 425, with a slight increase in brightness with each iteration, until either the object 110 is sufficiently illuminated or the illumination source 104 reaches the maximum level of illumination. Upon determining that the object 110 is sufficiently illuminated for identifying the landmarks 114 of the object 110 in the decision block 415, the computer 108 maintains the brightness at a current brightness level. The computer 108 can thus find the lowest brightness level at which the illumination source 104 sufficiently illuminates the object 110.

Remaining with the block 425, for another example, the computer 108 can increase the brightness of illumination source 104 to a prestored brightness level and then decrease the brightness of the illumination source 104 within a prestored duration after increasing the brightness. The prestored brightness level can be the maximum level of illumination from the decision block 420. The prestored duration can be a duration during which the camera 106 can capture five frames at most, e.g., a duration in which the camera 106 can capture one or two frames. The computer 108 prevents the brightness of the illumination source 104 from being set to the prestored brightness level for longer than the prestored duration. The computer 108 can thus use a very bright level of illumination to provide sufficient illumination for the object 110 while keeping the duration of that level of illumination short enough to be appropriate for a person. After the block 425, the process 400 returns to the decision block 415.

In the block 430, the computer 108 identifies the landmarks 114 of the object 110 in the image data 112. For example, if the object 110 is a human face, the locations of the landmarks 114 can be outputted as a result of the facial-detection technique used in the decision block 410 above. The computer 108 can use the output from the decision block 410, or the computer 108 can run the facial-detection technique again, e.g., if the brightness of the illumination source 104 was increased in the block 425. As shown in FIG. 3, for example, the landmarks 114 are the nose and the ear of a human face. The locations of the landmarks 114 within the image frame are specified in pixel coordinates, e.g., ($p_x$, $p_y$), in which $p_x$ is a horizontal pixel distance in the image frame and $p_y$ is a vertical pixel distance in the image frame.

Next, in a block 435, the computer 108 determines the pixel distance d between the landmarks 114 in the image data 112. The pixel distance d can be a Euclidean distance in pixel coordinates, e.g., $$d = \sqrt{(p_{x1} - p_{x2})^2 - (p_{y1} - p_{y2})^2}$$

in which ($p_{x1}$, $p_{y1}$) are the pixel coordinates of one of the landmarks 114 and ($p_{x2}$, $p_{y2}$) are the pixel coordinates of the other of the landmarks 114.

Next, in a block 440, the computer 108 determines a distance D from the camera 106 to the object 110 based on the pixel distance d between the landmarks 114 in the image data 112. The computer 108 stores a predefined relationship between the distance D and the pixel distance d. For example, the predefined relationship can be linear, i.e., the distance D is equal to the pixel distance d multiplied by a prestored distance-to-pixel-distance ratio R, i.e., D=Rd. The ratio R can be a value stored in memory, i.e., a constant. The value of the ratio R can be based on a known geometrical relationship between the pixel distance d, the physical distance between the features of the object 110 corresponding to the landmarks 114 in the image data 112, and the distance D to the object 110. The physical distance between the features varies within a population of objects 110 of the same type as the object 110 according to a statistical distribution, e.g., a normal distribution. The value of the ratio R can be based on the physical distance between the features being at least a 90th percentile size, e.g., being a 95th percentile size, of the statistical distribution of the objects 110 of the same type as the object 110; in other words, the, e.g., 95th percentile size of the physical distance is used in the known geometrical relationship between the pixel distance d, the physical distance, and the distance D to determine the value of the ratio R. Using a high percentile is a conservative assumption, meaning that the object 110 is likely farther away than the distance D, e.g., using a 95th percentile means that there is a 95% chance that the object 110 is farther away than the distance D. This helps keep the brightness of the illumination source 104 within an appropriate range when adjusting the brightness in a block 445 below.

Remaining with the block 440, for another example, the predefined relationship can depend on an orientation of the object 110. If the object 110 is a human face, the orientation of the object 110 can be outputted as a result of the facial-detection technique used in the decision block 410 above. The orientation can be represented as an angle $\theta$ of a line between the features of the object 110 corresponding to the landmarks 114 in the image data 112 with respect to the camera 106. The angle $\theta$ can be used to adjust the pixel distance d when determining the distance D, e.g., $D=R(\sin(\theta))d$, with the ratio R being the same as described above. Alternatively or additionally, the computer 108 can map the landmarks 114 to features on a prestored three-dimensional model of the object 110 and then use known geometrical relationships to determine the distance D.

Next, in a block 445, the computer 108 adjusts the brightness of the illumination source 104 based on the distance D. The computer 108 adjusts the brightness to a brightness level B. The computer 108 stores a predefined relationship between the distance D and the brightness level B to which the computer 108 adjusts the illumination source 104. For example, the computer 108 can store a lookup table pairing values of the distance D with respective values of the brightness level B. For another example, the computer 108 can calculate the brightness level B according to a stored formula, e.g., $B=kD^2$, in which k is a constant. Regardless of how the relationship is stored by the computer 108, the brightness level B can have an increasing relationship with the distance D, i.e., the brightness level B gets brighter as the distance D gets longer. As the person is farther away, the illumination source 104 can use a higher brightness level B while still remaining in an appropriate range. For example, the brightness level B can increase with the square of the distance D.

Additionally or alternatively, the brightness level B can be based on an ambient brightness $B_{amb}$ in addition to the distance D. For example, the computer 108 can choose the brightness level B to bring a total brightness $B+B_{amb}$ to a target level, with the target level increasing with the square of the distance D, e.g., $B=kD^2-B_{amb}$. The ambient brightness can be determined as described above with respect to the decision block 415.

Additionally or alternatively, the brightness level B can be based on a speed V of the vehicle 100 in addition to the distance D. For example, the brightness level B can have an increasing relationship with the speed V, e.g., $B=kD^2+f(V)$, in which f( ) is a function returning a positive value. As the speed V increases, the total exposure of the object to the illumination source 104 decreases, permitting a greater brightness level B.

Additionally or alternatively, the brightness level B can be based on a reflectance R of the object in addition to the distance D. Highly reflective objects can cause oversaturation if the brightness level B is too high. For example, the brightness level B can be a lower of an appropriate brightness level $B_{unc}$ and a brightness level $B_{sat}$ below which oversaturation does not occur, e.g., $B=\min(B_{unc}, B_{sat})$. The appropriate brightness level $B_{unc}$ can be calculated as described in the previous examples for the brightness level B. The saturation brightness level $B_{sat}$ can be a function of reflectance R of the object and the distance D to the object, i.e., $B_{sat}=f(R, D)$. The reflectance R can be a value stored in memory for the type of the object, e.g., for a face, for another vehicle, etc. The saturation brightness level can have a positive relationship with the distance D and an inverse relationship with the reflectance R.

Next, in a block 450, the computer 108 illuminates at least one additional illumination source 104 besides the illumination source 104 adjusted in the block 445 while receiving new image data 112 from the camera 106. The additional illumination sources 104 shine in directions that encompass the object 110, thus the object 110 is illuminated from illumination sources 104 at multiple angles. Alternatively or additionally, the computer 108 may turn off one of the illumination sources 104 that is currently on while receiving new image data 112 from the camera 106.

Next, in a decision block 455, the computer 108 performs object recognition on the image data 112 of the object 110, e.g., the image data 112 received while multiple illumination sources 104 are illuminated at the object 110 in the block 450. For example, if the object 110 is a human face, the computer 108 can perform facial recognition to determine whether the face is a recognized face, i.e., a face stored in memory of a known person such as an owner or operator of the vehicle 100. The computer 108 can use any suitable facial-recognition technique, e.g., template matching; statistical techniques such as principal component analysis (PCA), discrete cosine transform, linear discriminant analysis, locality preserving projections, Gabor wavelet, independent component analysis, or kernel PCA; neural networks such as neural networks with Gabor filters, neural networks with Markov models, or fuzzy neural networks; etc. If the object 110, e.g., face, is not a recognized object 110, e.g., recognized face, then the process 400 ends without actuating any vehicle components 118 as described below with respect to a block 465. If the object 110, e.g., face, is a recognized object 110, e.g., recognized face, then the process 400 proceeds to a decision block 460.

In the decision block 460, the computer 108 determines whether at least one feature of the object 110 is three-dimensional. For example, the computer 108 can compare shadows from the image data 112 received before and after illuminating (or turning off) an additional illumination source 104 in the block 450. For example, if the object 110 is a face, then the feature can be the nose, and the computer 108 can compare the shadows cast by the nose. If the shadows have changed, then the object 110 is deemed three-dimensional. If the shadows are similar for both illumination situations, then the recognized object 110 may be a spoofing attempt, e.g., a picture of a recognized face held up to the camera 106 and not an actual face. If the feature of the object 110 is not three-dimensional, the process 400 ends without actuating any vehicle components 118 as described below with respect to the block 465. If the feature of the object 110 is three-dimensional, then the process 400 proceeds to the block 465.

In the block 465, the computer 108 actuates at least one of the vehicle components 118. For example, the computer 108 can instruct the door locks 120 to unlock. For another example, the computer 108 can adjust one of the seats 122 to a predetermined arrangement. The predetermined arrangement can be stored in memory paired with the recognized face. For another example, the computer 108 can activate the climate-control system 124.

Next, in a decision block 470, the computer 108 determines whether the vehicle 100 is still running. If the vehicle 100 is still running, the process 400 returns to the block 405 to continue receiving image data 112 from the camera 106. If the vehicle 100 has been turned off, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:
an illumination source;
a camera arranged to detect illumination from the illumination source; and
a computer communicatively coupled to the illumination source and the camera;
wherein the computer is programmed to:

detect an object in image data from the camera;
identify landmarks of the object in the image data;
determine a distance from the camera to the object based on a pixel distance between the landmarks in the image data;
adjust a brightness of the illumination source based on the distance; and
after adjusting the brightness of the illumination source and receiving new image data, perform object recognition on the new image data of the object to recognize the object as a recognized specific individual object.

2. The system of claim 1, wherein the illumination source is configured to produce illumination outside a visible range.

3. The system of claim 2, wherein the illumination source is configured to produce infrared illumination.

4. A computer comprising a processor and a memory storing instructions executable by the processor to:
detect an object in image data from a camera;
identify landmarks of the object in the image data;
determine a distance from the camera to the object based on a pixel distance between the landmarks in the image data;
adjust a brightness of an illumination source based on the distance, the illumination source arranged to produce illumination detectable by the camera; and
after adjusting the brightness of the illumination source and receiving new image data, perform object recognition on the new image data of the object to recognize the object as a recognized specific individual object.

5. The computer of claim 4, wherein the object is a human face.

6. The computer of claim 4, wherein the instructions further include instructions to actuate a vehicle component upon the object recognition recognizing the object as a recognized specific individual object.

7. The computer of claim 5, wherein the instructions further include instructions to determine whether a feature of the face is three-dimensional.

8. The computer of claim 7, wherein the illumination source is a first illumination source, and the instructions further include instructions to illuminate a second illumination source while receiving the new image data.

9. The computer of claim 4, wherein adjusting the brightness of the illumination source includes adjusting the brightness to a brightness level, and the brightness level has an increasing relationship with the distance.

10. The computer of claim 4, wherein determining the distance from the camera to the object includes multiplying the pixel distance by a prestored distance-to-pixel-distance ratio.

11. The computer of claim 10, wherein the prestored distance-to-pixel-distance ratio is based on at least a 90th percentile size of a statistical distribution of objects of a same type as the object.

12. The computer of claim 4, wherein the instructions further include instructions to determine whether the object is sufficiently illuminated for identifying the landmarks of the object.

13. The computer of claim 12, wherein the instructions further include instructions to increase the brightness of the illumination source upon determining that the object is insufficiently illuminated for identifying the landmarks of the object.

14. The computer of claim 13, wherein the instructions further include instructions to decrease the brightness of the illumination source within a prestored duration after increasing the brightness.

15. The computer of claim 14, wherein the prestored duration is at most a duration in which the camera can capture five frames.

16. The computer of claim 14, wherein increasing the brightness includes increasing the brightness to a prestored brightness level, and the instructions further include instructions to prevent the brightness of the illumination source from being set to the prestored brightness level for longer than the prestored duration.

17. The computer of claim 12, wherein increasing the brightness includes increasing the brightness at a prestored rate while receiving additional image data.

18. The computer of claim 17, wherein the instructions further include instructions to maintain the brightness at a current brightness level upon determining that the object is sufficiently illuminated for identifying the landmarks of the object.

19. A method comprising:
detecting an object in image data from a camera;
identifying landmarks of the object in the image data;
determining a distance from the camera to the object based on a pixel distance between the landmarks in the image data;
adjusting a brightness of an illumination source based on the distance, the illumination source arranged to produce illumination detectable by the camera; and
after adjusting the brightness of the illumination source and receiving new image data, performing object recognition on the new image data of the object to recognize the object as a recognized specific individual object.

20. The computer of claim 4, wherein the instructions further include instructions to actuate a component upon the object recognition recognizing the object as a recognized specific individual object.

* * * * *